US012418109B2

(12) United States Patent
Shahvirdi Dizaj Yekan

(10) Patent No.: US 12,418,109 B2
(45) Date of Patent: Sep. 16, 2025

(54) REFLECTARRAY ANTENNA WITH TWO-DIMENSIONAL BEAM SCANNING

(71) Applicant: BDCM A2 LLC, Dover, DE (US)

(72) Inventor: Taha Shahvirdi Dizaj Yekan, San Diego, CA (US)

(73) Assignee: BDCM A2 LLC, Dover, DE (US)

( * ) Notice: Subject to any disclaimer, the term of this patent is extended or adjusted under 35 U.S.C. 154(b) by 0 days.

(21) Appl. No.: 17/778,807

(22) PCT Filed: Jan. 8, 2021

(86) PCT No.: PCT/US2021/012825

§ 371 (c)(1),
(2) Date: May 20, 2022

(87) PCT Pub. No.: WO2021/150384

PCT Pub. Date: Jul. 29, 2021

(65) Prior Publication Data

US 2022/0416422 A1 Dec. 29, 2022

Related U.S. Application Data

(60) Provisional application No. 62/958,575, filed on Jan. 8, 2020.

(51) Int. Cl.

*H01Q 3/46* (2006.01)
*H01Q 3/36* (2006.01)
*H01Q 21/06* (2006.01)

(52) U.S. Cl.

CPC ................. *H01Q 3/46* (2013.01); *H01Q 3/36* (2013.01); *H01Q 21/065* (2013.01)

(58) Field of Classification Search

CPC .......... H01Q 3/46; H01Q 3/36; H01Q 21/065; H01Q 15/0026; H01Q 19/104

See application file for complete search history.

(56) References Cited

U.S. PATENT DOCUMENTS 3,340,535 A * 9/1967 Damonte ............. H01Q 19/195 343/837
7,898,480 B2 * 3/2011 Ebling ..................... H01Q 3/30 343/810

(Continued)

FOREIGN PATENT DOCUMENTS

CN 111463574 7/2020
JP 2019-186668 A 10/2019
JP 2019-536384 A 12/2019

OTHER PUBLICATIONS

Japanese Office Action dated Dec. 6, 2024 issued in JP Application No. 2022-530927 (11 pages).

(Continued)

*Primary Examiner* — Dimary S. Lopez Cruz
*Assistant Examiner* — Aladdin Abdulbaki
(74) *Attorney, Agent, or Firm* — Dinsmore & Shohl LLP

(57) ABSTRACT

Examples disclosed herein relate to a reflectarray antenna system with two-dimensional beam scanning that includes a first reflectarray having a polarizing grid that operates as a reflective surface in a first polarization and operates as a transparent surface in a second polarization. The reflectarray antenna system includes a second reflectarray comprising an array of reflectarray cells and arranged parallel to the first reflectarray. The second reflectarray includes a first set of feed elements arranged along a first axis and a second set of feed elements arranged along a second axis orthogonal to the first axis to scan a field of view along the first and second axes. The second reflectarray can radiate radio frequency (RE) beams in the first polarization with the first and second sets of feed elements for reflection at the polarizing grid and radiate reflected RE beams in the second polarization for transmission through the polarizing grid.

19 Claims, 10 Drawing Sheets

(56) References Cited

U.S. PATENT DOCUMENTS

| | | | | |
|---|---|---|---|---|
| 10,833,404 | B1 * | 11/2020 | Kaddour | H01Q 15/0066 |
| 2001/0028328 | A1 * | 10/2001 | Stjernman | H01Q 15/0013 343/832 |
| 2009/0273517 | A1 * | 11/2009 | Thiesen | H01Q 21/065 342/372 |
| 2016/0240931 | A1 * | 8/2016 | Nakamura | H01Q 21/061 |
| 2017/0117950 | A1 * | 4/2017 | Strong | H04L 27/26 |
| 2017/0179596 | A1 * | 6/2017 | Diaz | H01Q 3/34 |
| 2017/0373371 | A1 * | 12/2017 | Gabriel | H01Q 3/08 |
| 2017/0373401 | A1 * | 12/2017 | Visentin | H01Q 19/19 |
| 2019/0079321 | A1 * | 3/2019 | Wu | G02F 1/0555 |
| 2020/0136240 | A1 * | 4/2020 | Pelletti | G05D 1/028 |
| 2020/0381839 | A1 * | 12/2020 | Shahvirdi Dizaj Yekan | H01Q 3/20 |

OTHER PUBLICATIONS

Hu Yun, et al., "A Multibeam Folded Reflectarray Antenna With Wide Coverage and Integrated Primary Sources for Milllimeter-Wave Massive MIMO Applications", IEEE Transactions on Antennas and Propagation, IEEE Dec. 2018, vol. 66, No. 12, pp. 6875-6882 (8 pages).

* cited by examiner

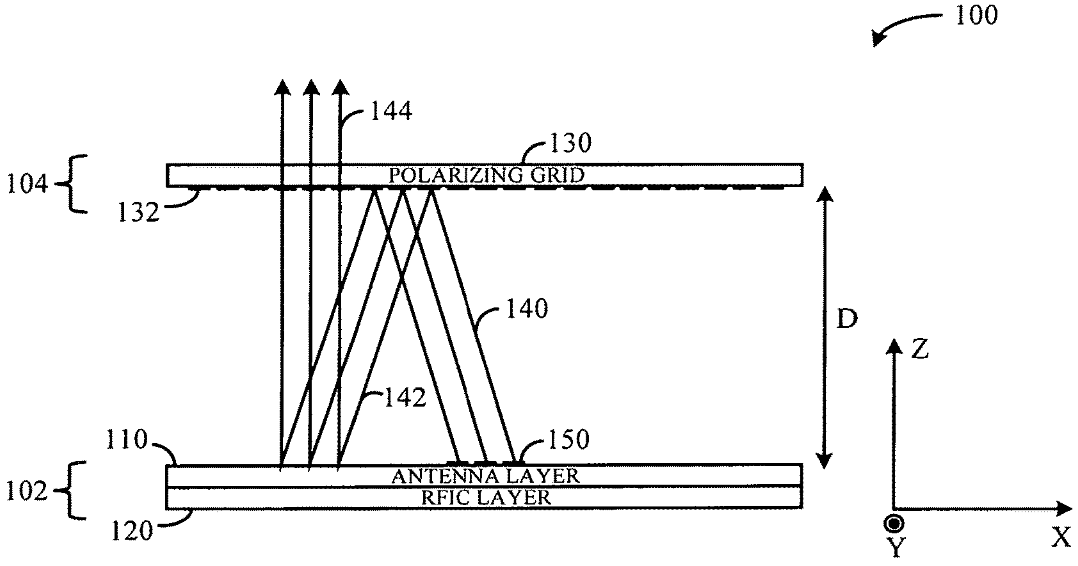
*FIG. 1A*
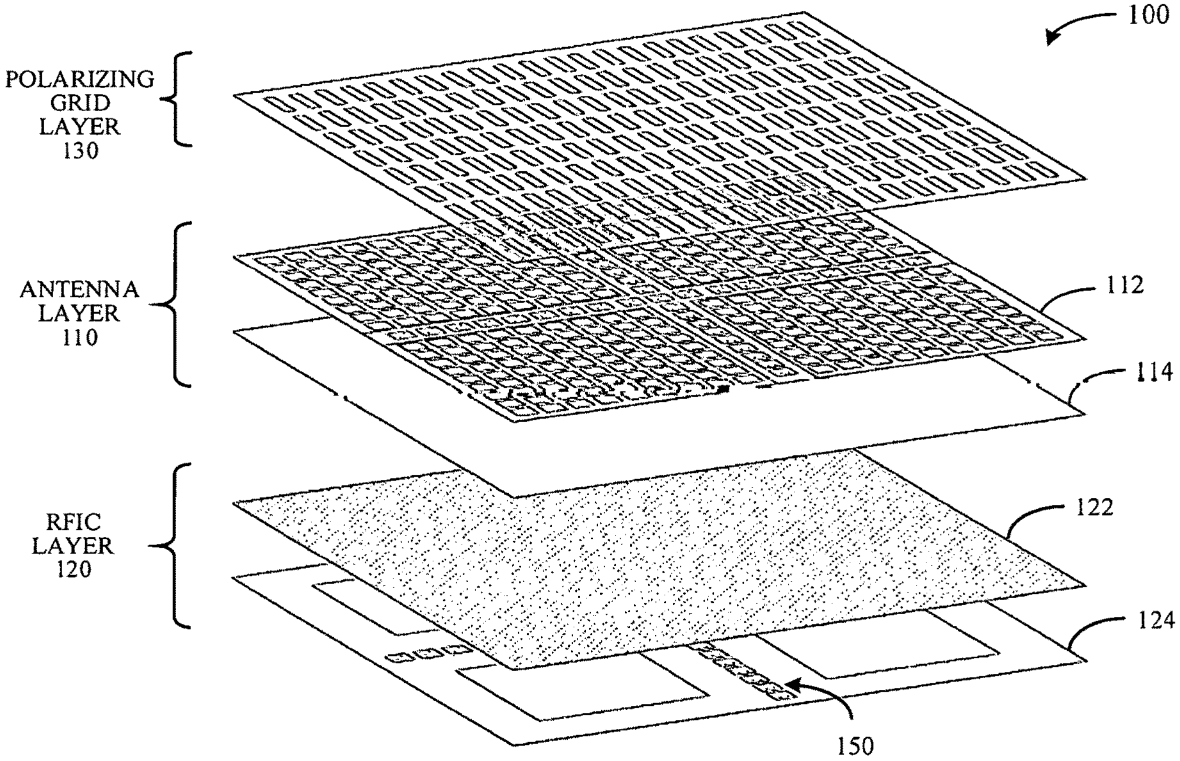
*FIG. 1A-B*

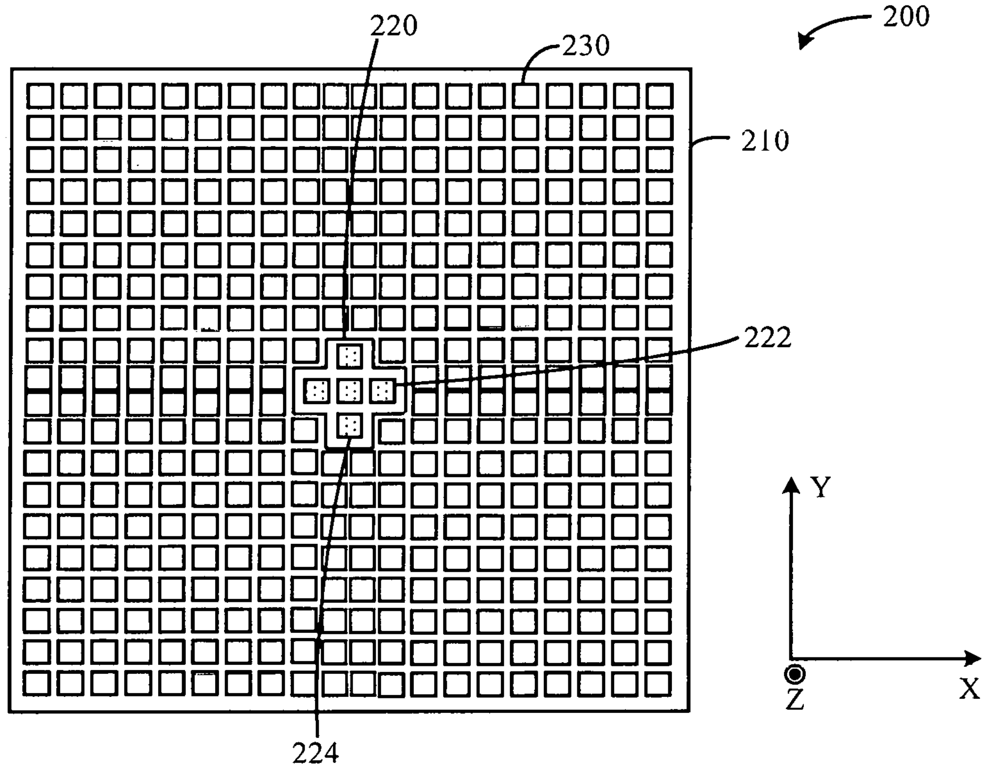
*FIG. 2A*
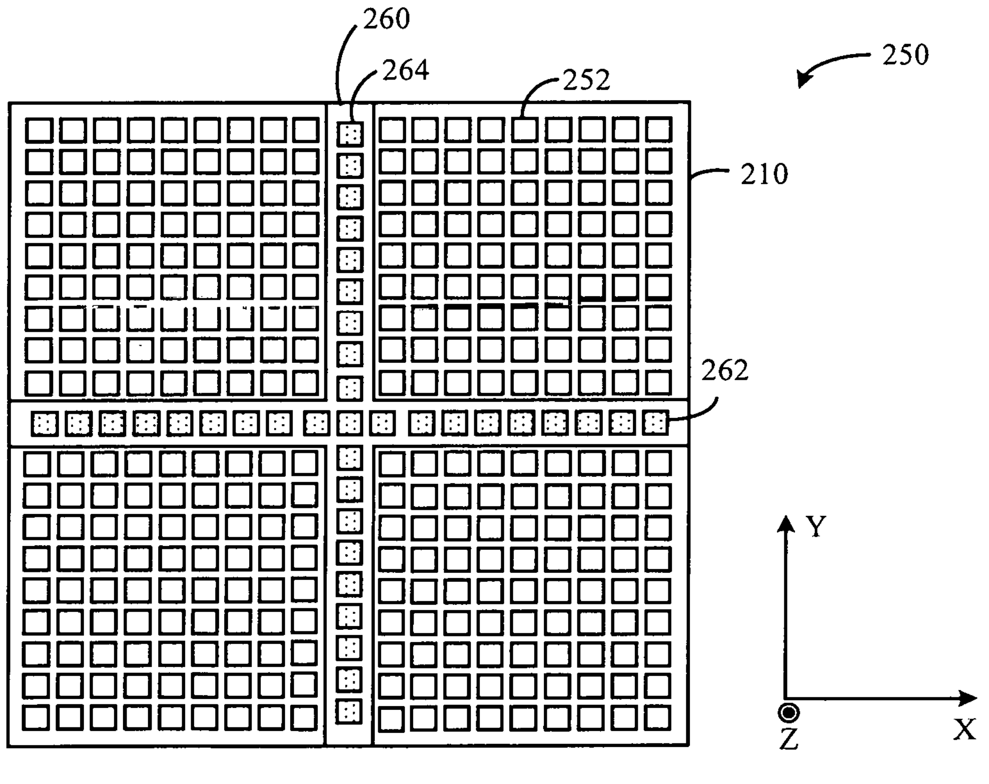
*FIG. 2A-B*

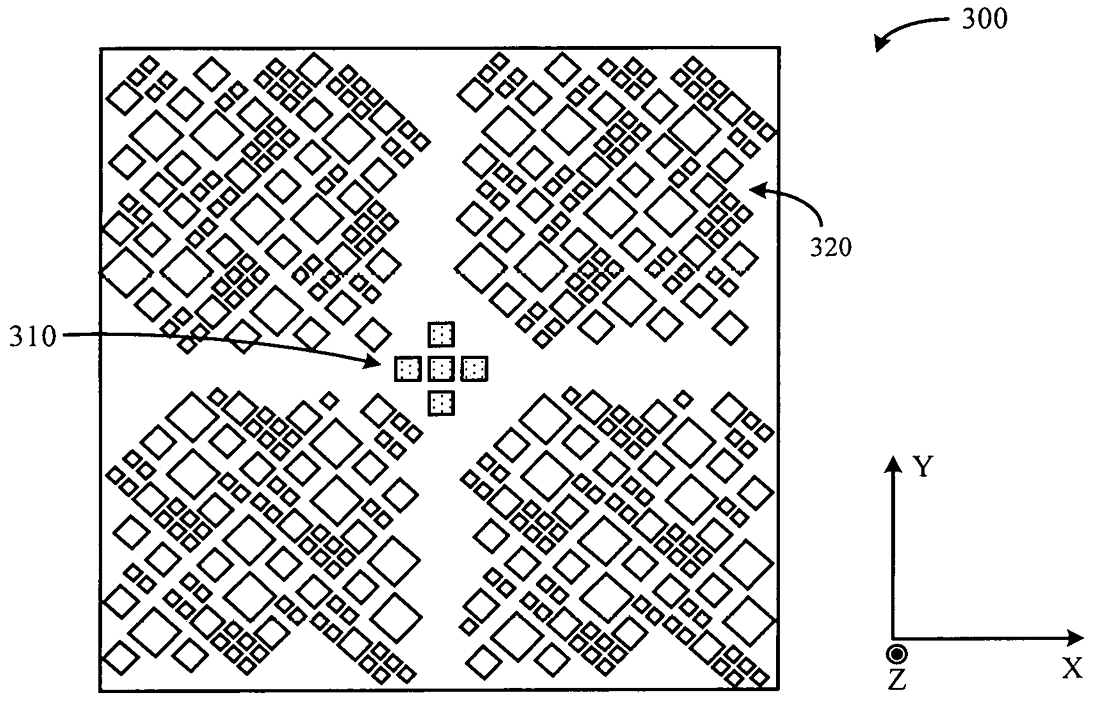
*FIG. 3A*
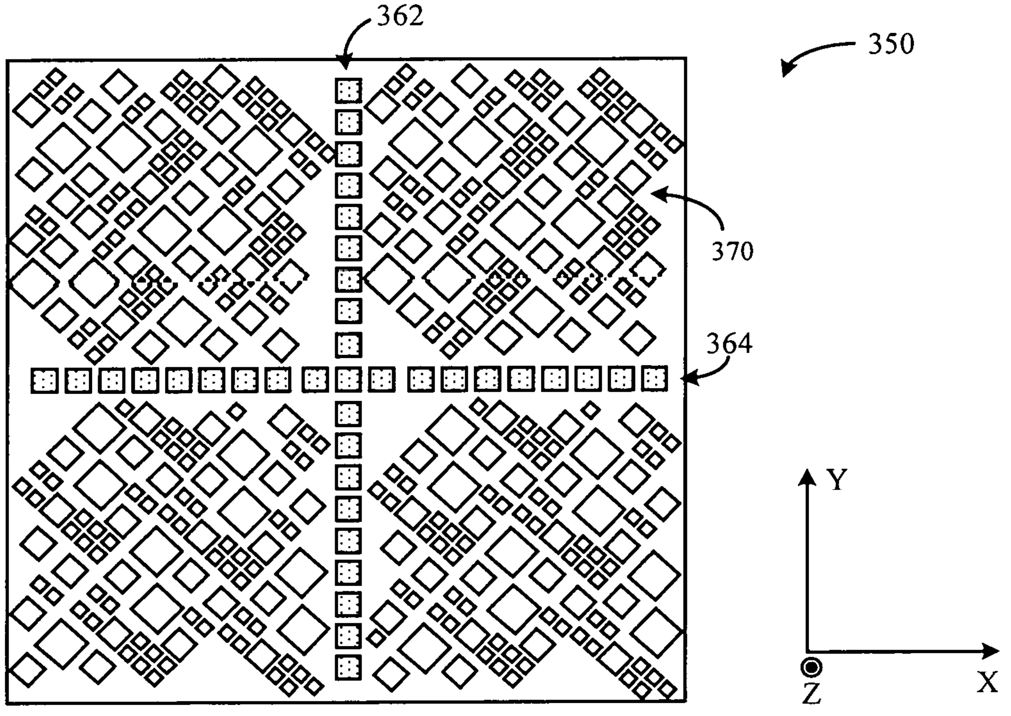
*FIG. 3A-B*

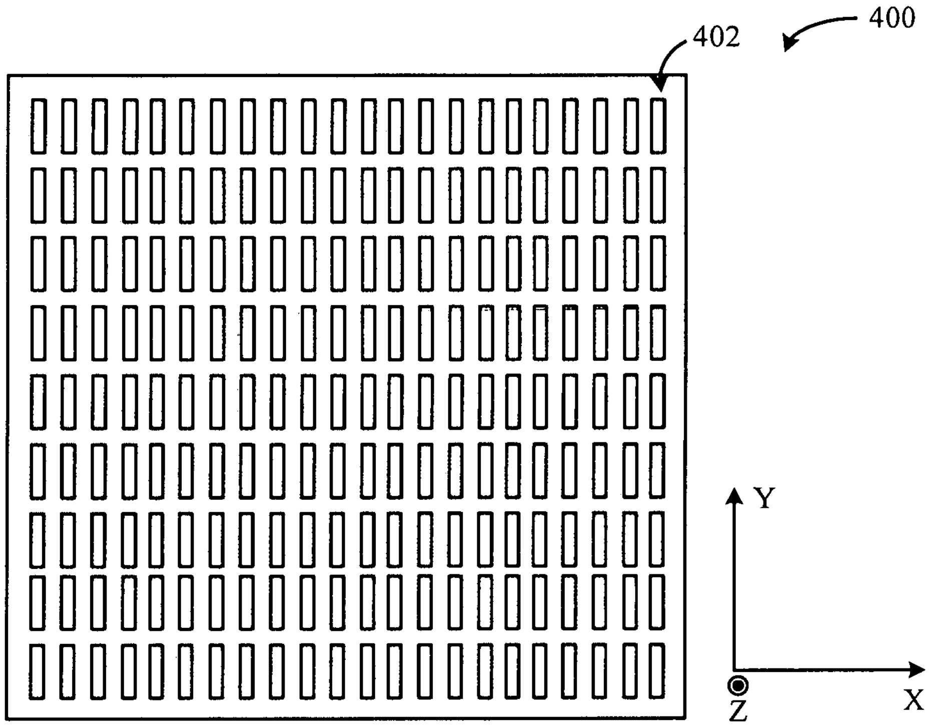
*FIG. 4A*
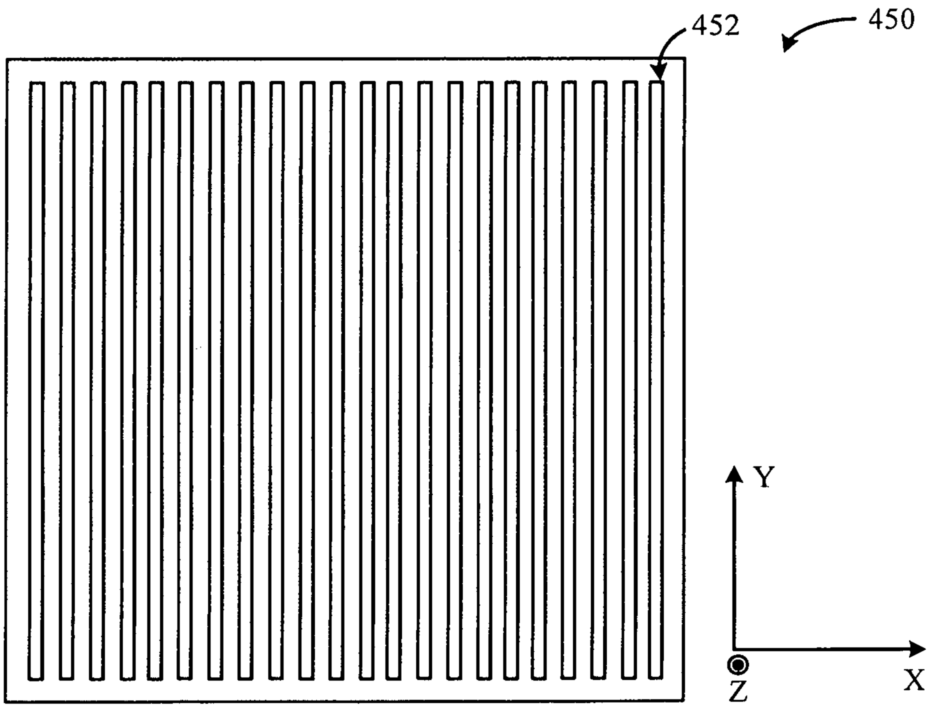
*FIG. 4A-B*

REFLECTARRAY ANTENNA WITH TWO-DIMENSIONAL BEAM SCANNING

CROSS-REFERENCE TO RELATED APPLICATIONS

This application is a U.S. national stage application under 35 U.S.C. § 371 of International Patent Application No. PCT/US2021/012825, titled "Reflectarray Antenna With Two-Dimensional Beam Scanning," filed on Jan. 8, 2021, which claims priority from U.S. Provisional Application No. 62/958,575, titled "Reflectarray Antenna With Two-Dimensional Beam Scanning," filed on Jan. 8, 2020, all of which are incorporated by reference herein.

BACKGROUND

Phased array antennas form a radiation pattern by combining signals from a number of antenna elements and controlling the phase and amplitude of each element. The antenna or radiating elements are arranged in an array or sub-arrays and typically include patches in a patch antenna configuration, a dipole, or a magnetic loop, among others. The relative phase between each radiating element can be fixed or adjusted by employing phase shifters coupled to each element. The direction of the beam generated by the antenna is controlled by changing the phase of the individual elements.

BRIEF DESCRIPTION OF THE DRAWINGS

The present application may be more fully appreciated in connection with the following detailed description taken in conjunction with the accompanying drawings, which are not drawn to scale and in which like reference characters refer to like parts throughout, and wherein:

FIG. 1A illustrates a cross-sectional view of a reflectarray configuration in accordance to various implementations of the subject technology;

FIG. 1B illustrates an exploded perspective view of an example stack-up configuration of the reflectarray configuration of FIG. 1A in accordance with some implementations of the subject technology;

FIG. 2A illustrates a schematic diagram of a top view of the antenna layer in the reflectarray configuration of FIG. 1A with a first reflectarray cell layout and a first feed element layout in accordance to various implementations of the subject technology;

FIG. 2B illustrates a schematic diagram of a top view of another example of the antenna layer in the reflectarray configuration of FIG. 1A with a first reflectarray cell layout and a second feed element layout in accordance to various implementations of the subject technology;

FIG. 3A illustrates a schematic diagram of a top view of the antenna layer in the reflectarray configuration of FIG. 1A with a second reflectarray cell layout and a first feed element layout in accordance to various implementations of the subject technology;

FIG. 3B illustrates a schematic diagram of a top view of another example of the antenna layer in the reflectarray configuration of FIG. 1A with a second reflectarray cell layout and a second feed element layout in accordance to various implementations of the subject technology;

FIG. 4A illustrates a schematic diagram of a top view of the polarizing grid layer in the reflectarray configuration of FIG. 1A with a first polarizing layout in accordance to various implementations of the subject technology;

FIG. 4B illustrates a schematic diagram of a top view of another example of the polarizing grid layer in the reflectarray configuration of FIG. 1A with a second polarizing layout in accordance to various implementations of the subject technology;

DETAILED DESCRIPTION

Figure 5:
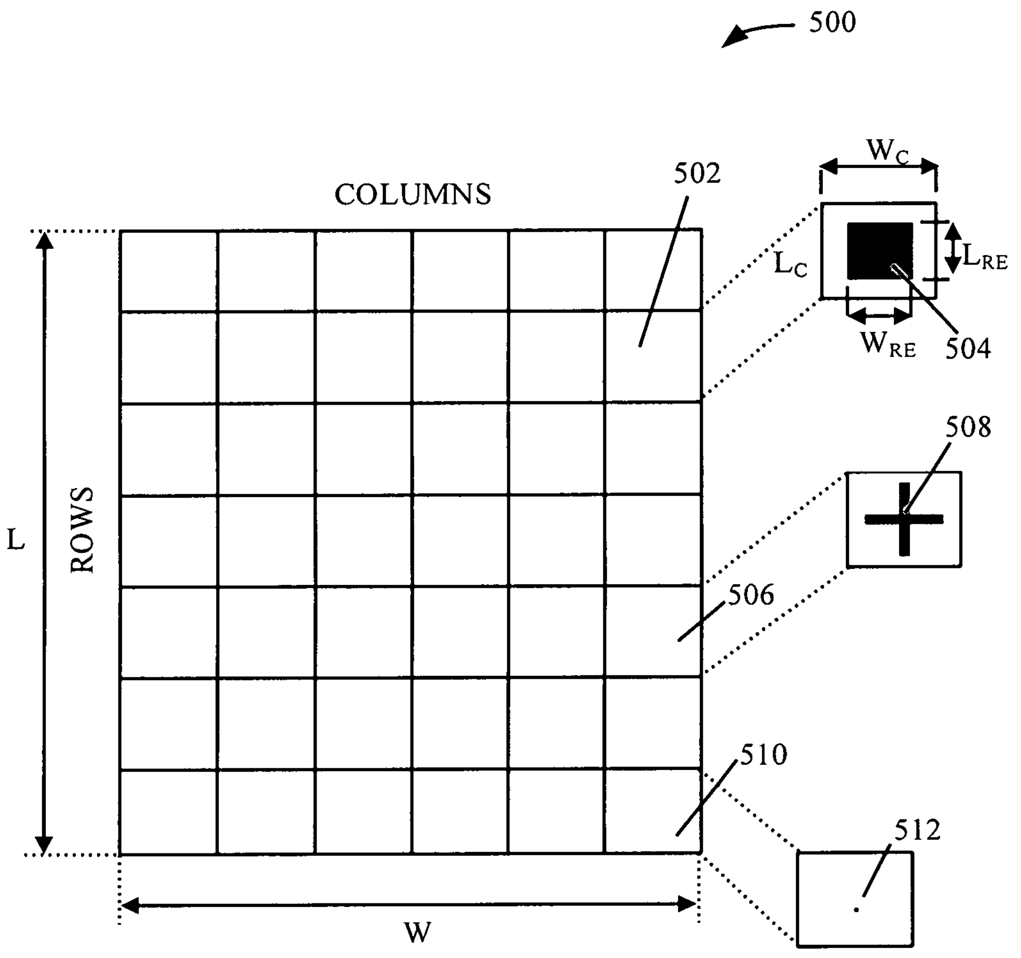
FIG. 5 illustrates a schematic diagram of a reflectarray antenna with various cell configurations in accordance to various implementations of the subject technology.

The present disclosure provides for a reflectarray antenna system with two-dimensional beam scanning that includes a first reflectarray having a polarizing grid that operates as a reflective surface in a first polarization and operates as a transparent surface in a second polarization. The reflectarray antenna system includes a second reflectarray comprising an array of reflectarray cells and arranged parallel to the first reflectarray. The second reflectarray includes a first set of feed elements arranged along a first axis and a second set of feed elements arranged along a second axis orthogonal to the first axis to scan a field of view along the first and second axes. The second reflectarray can radiate radio frequency (RF) beams in the first polarization with the first and second sets of feed elements for reflection at the polarizing grid and radiate reflected RF beams in the second polarization for transmission through the polarizing grid.

The present inventions avoid the need for complicated feed networks and other structures for feeding signals to an antenna. The layered approach provide U-V beam scanning with linear arrays and a polarizing grid. The grid enables beam directivity and phase shifting. Feed elements are provided in a layer of the stack, and they may be programmable to operate as transmit directing signals to power amplifiers, or as receive directing signals to low noise amplifiers. The stack up has an RFIC layer for the various analog components.

Autonomous driving is quickly moving from the realm of science fiction to becoming an achievable reality. Already in the market are Advanced-Driver Assistance Systems (ADAS) that automate, adapt and enhance vehicles for safety and better driving. The next step will be vehicles that increasingly assume control of driving functions such as steering, accelerating, braking and monitoring the surrounding environment and driving conditions to respond to events, such as changing lanes or speed when needed to avoid traffic, crossing pedestrians, animals, and so on.

The present disclosure relates to automotive radar sensors capable of reconstructing the world around them and are effectively a radar "digital eye," having true 3D vision and capable of human-like interpretation of the world. For example, the subject technology supports autonomous driving with improved sensor performance, all-weather/all-condition detection, advanced decision-making algorithms and interaction with other sensors through sensor fusion. These configurations optimize the use of radar sensors, as radar is not inhibited by weather conditions in many applications, such as for self-driving cars. The ability to capture environmental information early aids control of a vehicle, allowing anticipation of hazards and changing conditions. The sensor performance is also enhanced with these structures, enabling long-range and short-range visibility to the controller. In an automotive application, short-range is considered within 30 meters of a vehicle, such as to detect a person in a cross walk directly in front of the vehicle; and long-range is considered to be 250 meters or more, such as to detect approaching cars on a highway.

Moreover, new generation wireless networks are increasingly becoming a necessity to accommodate user demands. Mobile data traffic continues to grow every year, challenging the wireless networks to provide greater speed, connect more devices, have lower latency, and transmit more and more data at once. Users now expect instant wireless connectivity regardless of the environment and circumstances, whether it is in an office building, a public space, an open preserve, or a vehicle. In response to these demands, new wireless standards have been designed for deployment in the near future. A large development in wireless technology is the fifth generation of cellular communications ("5G"), which encompasses more than the current Long-Term Evolution ("LTE") capabilities of the Fourth Generation ("4G") and promises to deliver high-speed Internet via mobile, fixed wireless and so forth. The 5G standards extend operations to millimeter wave bands, which cover frequencies beyond 6 GHz, and to planned 24 GHz, 26 GHz, 28 GHz, and 39 GHz up to 300 GHz, all over the world, and enable the wide bandwidths needed for high speed data communications.

The millimeter wave ("mm-wave") spectrum provides narrow wavelengths in the range of ~1 to 10 millimeters that are susceptible to high atmospheric attenuation and have to operate at short ranges (just over a kilometer). In dense-scattering areas with street canyons and in shopping malls for example, blind spots may exist due to multipath, shadowing and geographical obstructions. In remote areas where the ranges are larger and sometimes extreme climatic conditions with heavy precipitation occur, environmental conditions may prevent operators from using large array antennas due to strong winds and storms.

In particular, future developments and integration of 5G technologies for user wireless communications represent a great challenge. Specifically, base stations for 5G wireless communications need to provide constant power over a certain angular range. In this respect, the antenna is an important subsystem for wireless communications, since it is the device that converts the guided waves into propagating waves in free space and vice versa. Different parameters of the antenna may be optimized depending on the application, such as size, radiation pattern, matching, etc. In many cases, a shaped-beam pattern is necessary to adequately redirect power to the desired area. These and other challenges in providing millimeter wave wireless communications for 5G networks impose ambitious goals on system design, including the ability to generate desired beam forms at controlled directions while avoiding interference among the many signals and structures of the surrounding environment.

In various examples described herein below, a phased array antenna generates a narrow, directed beam that can be steered to any angle (e.g., in a range of 0° to 360°) across a Field of View (FoV) to detect objects. Beam steering is accomplished with the use of phase shifters coupled to the antenna elements. Power and low noise amplifiers adjust the gain of the antenna to provide beams for both short and long ranges (e.g., >250 m). The phase array antenna includes a lattice array of radiating elements, a transmission array and a feed structure. The feed structure distributes a transmission signal throughout the antenna array structure, in which the transmission signal propagates along vertical transitions that feed transmission signals through the different layers to a lattice array of radiating elements, such as, for example, meta-structure unit cells. A meta-structure (MTS), as generally defined herein, is an engineered, non- or semi-periodic structure that is spatially distributed to meet a specific phase and frequency distribution. In some implementations, the meta-structures include metamaterials. In this way, there are multiple layers of radiating elements, including the meta-structure layer(s). The radiating layers may be fed from multiple sides, such as orthogonal feed distribution networks. In this way, beam steering is supported in multiple dimensions. In some implementations, the feed structure includes the stripline power divider circuit with embedded resistor plane as will be described in the present disclosure in more detail.

The subject technology relates to smart active antennas with unprecedented capability of manipulating Radio Frequency (RF) waves to scan an entire environment in a fraction of the time of current systems. The subject technology also relates to smart beam steering and beam forming using MTS radiating structures in a variety of configurations, in which electrical changes to the antenna are used to achieve phase shifting and adjustment reducing the complexity and processing time and enabling fast scans of up to approximately 360° field of view for long range object detection. The subject technology uses radar to provide information for two-dimensional (2D) image capability as they measure range and azimuth angle, providing distance to an object and azimuth angle identifying a projected location on a horizontal plane, respectively, without the use of traditionally large antenna elements.

The present disclosure relates to radiating structures, such as for radar and cellular antennas, that provide enhanced phase shifting of the transmitted signal to achieve transmission in the autonomous vehicle communication and detection spectrum, which in the US is approximately 77 GHz and has a 5 GHz range, specifically, 76 GHz to 81 GHz, to reduce the computational complexity of the system, and to increase the transmission speed. The disclosure is not limited to these applications and may be readily employed in other antenna applications, such as wireless communications, 5G cellular, fixed wireless and so forth. In some implementations, the present disclosure accomplishes these goals by taking advantage of the properties of MTS elements coupled with novel feed structures.

The subject technology is applicable in wireless communication and radar applications, and in particular those incorporating meta-structures capable of manipulating electromagnetic waves using engineered radiating structures. For example, the present disclosure provides for antenna structures having MTS elements and arrays. There are structures and configurations within a feed network to the MTS elements that increase performance of the antenna structures in many applications, including vehicular radar modules. In various examples, the MTS elements include metamaterial elements.

Metamaterials derive their unusual properties from structure rather than composition and they possess exotic properties not usually found in nature. The metamaterials are structures engineered to have properties not found in nature. The metamaterial antennas may take any of a variety of forms, some of which are described herein for comprehension; however, this is not an exhaustive compilation of the possible implementations of the present disclosure. Metamaterials are typically arranged in repeating patterns. For antennas, metamaterials may be built at scales much smaller than the wavelengths of transmission signals radiated by the metamaterial. Metamaterial properties come from the engineered and designed structures rather than from the base material forming the structures. Precise shape, dimensions, geometry, size, orientation, arrangement and so forth result in the smart properties capable of manipulating EM waves by blocking, absorbing, enhancing, or bending waves.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology. In other instances, well-known methods and structures may not be described in detail to avoid unnecessarily obscuring the description of the examples. Also, the examples may be used in combination with each other.

FIG. 1A illustrates a cross-sectional view of a reflectarray configuration 100 in accordance to various implementations of the subject technology. Not all of the depicted components may he required, however, and one or more implementations may include additional components not shown in the figure. Variations in the arrangement and type of the components may be made without departing from the scope of the claims as set forth herein. Additional components, different components, or fewer components may be provided.

The reflectarray configuration 100 includes a pair of reflectarrays arranged in parallel to one another. In some implementations, the reflectarray configuration 100 includes a first reflectarray 102 and a second reflectarray 104 comprising a polarizing grid 130, which may serve as a reflective surface in a first polarization and serve as a transparent surface in a second polarization different from the first polarization. In some implementations, the first reflectarray 102 and the second reflectarray 104 are separated by a predetermined distance, D, along the z-axis.

The reflectarray configuration 100 includes a feed 150 in the first reflectarray 102 to illuminate the second reflectarray 104. As depicted in FIG. 1A, the second reflectarray 104 is illuminated by the feed 150 that generates an incident electric field on its surface. The feed 150 may be an array of feed elements in some implementations, or one or more horn antennas in other implementations. As will be discussed in FIGS. 1B and 1C, the array of feed elements may include a first set of feed elements along a first axis (e.g., x-axis) and a second set of feed elements arranged along a second axis (e.g., y-axis) to provide two-dimensional scanning with RF beams illuminating the upper reflector (e.g., the second reflectarray 104) in two axes.

In some implementations, each of the feed elements is radiating an RF beam concurrently toward a common location on the second reflectarray surface such that the superposition of the RF beams produces a combined beam with a predetermined gain at that location. In other implementations, the array of feed elements is switched sequentially such that one feed element radiates an RF beam at one time. In some aspects, the array of feed elements may radiate a shaped beam such as a sector beam in the azimuth direction and a sector beam in the elevation direction.

The second reflectarray 104 is arranged relative to the first reflectarray 102 such that RF radiation from the array of feed elements in the first polarization that illuminates the second reflectarray 104 (e.g., RF beams 140) is entirely reflected back toward the first reflectarray 102 (e.g., RF beams 142). In this respect, the RF radiation produced by the array of feed elements is polarized in such a way that it is reflected by the second reflectarray 104. In some implementations, the first reflectarray 102 can modify the initial polarization of the RF radiation reflected from the second reflectarray 104 (e.g., RF beams 142) to a target polarization so that the RF radiation reflected by the first reflectarray 102 (e.g., RF beams 144) is reflected back toward the second reflectarray 104 and passes through the second reflectarray 104. In some implementations, the first reflectarray 102 applies a phase shift to the RF radiation (e.g., RF beams 142) to modify its polarization by a predetermined amount. In some aspects, the phase shift applied is 90 degrees. In other aspects, the phase shift applied is 45 degrees. The phase shift applied by the first reflectarray 102 may vary without departing from the scope of the present disclosure.

In some implementations, the first reflectarray 102 includes an antenna layer 110 and an RF Integrated Circuit (RFIC) layer 120. In some aspects, the RFIC layer 120 may include power and digital circuitry components that interface with the RF front-end components on the RFIC layer 120. In some implementations, the first reflectarray 102 includes a stack up configuration that will be discussed in more detail in FIG. 3. For example, the first reflectarray 102 includes the antenna layer 110, the RFIC layer 120 and a digital and power layer (not shown) that includes the power and digital circuitry components on separate layering from the RFIC layer 120. As will be discussed in FIG. 4, the first reflectarray 102 may include a feed network and a combination network on a stripline layer (not shown) that is interposed between the antenna layer 110 and the RFIC layer 120 with vias penetrating through the internal layering from the stripline feed layer to the antenna layer 110 and the RFIC layer 120. As will be discussed in FIG. 5, the RFIC layer 120 may include individual components of RF front-end functionality, such as providing phase control elements that apply phase shifting to outgoing and incoming signaling, low-noise amplifiers for received signaling, and power amplifiers for outgoing signaling, among others. These RFIC components may be fabricated on a same semiconductor die in some implementations, or may be fabricated on separate semiconductor dies in other implementations.

The first reflectarray 102 includes an array of cells patterned on a top surface of the antenna layer 110. As will be discussed in FIG. 2, each cell in the array of cells may include a reflector element. In some aspects, the reflector element may be a patch, dipole, or other type of reflector element. In some implementations, the axes of the array of cells may be tilted by a predetermined amount of degrees (e.g., 45 degrees) with respect to the incident electric field. The incident field may be decomposed into two reflected field components that are parallel to respective patch axes (e.g., x-, y-axes). In some aspects, a phase difference of 180 degrees may occur between the reflection phase of the two reflected field components based at least on the dimensions of the cells. The reflected field components may be superpositioned to modify the polarization by 90 degrees.

The second reflectarray 104 may include a dielectric layer and a conductive layer disposed on the dielectric layer. The conductive layer may include a patterned grid (e.g., 132) on the bottom surface of the conductive layer facing the first reflectarray 102 that serves as the polarizing grid 130. In some implementations, the conductive layer has a substantially smaller thickness compared to the thickness of the dielectric layer. In this respect, the second reflectarray 104 can be transparent for the second polarization such that RF beams in the second polarization can pass through the second reflectarray 104. In some implementations, the polarizing grid 130 can be used as a ground plane of the second reflectarray 104 for the first polarization. The RF radiation from the array of feed elements is reflected back with a phase that corresponds to a specific dimension of the cells or specific dimensions of the reflector elements.

In some implementations, the first reflectarray 102 has a first phase distribution and the second reflectarray 104 has a second phase distribution. The second phase distribution may be mapped to the first phase distribution to cause RF beams originating from the feed illumination to be reflected from the second reflectarray 104 surface to a target reflector element on the first reflectarray 102 surface. For example, RF beams reflected at the second reflectarray 104 surface at a particular x-y coordinate are reflected onto the first reflectarray 104 surface at a corresponding x-y coordinate according to the mapping between the first phase distribution and the second phase distribution. In this respect, the reflector element on the first reflectarray 102 surface can modify the polarization of the reflected RF beam such that it passes through the second reflectarray 104.

FIG. 1B illustrates an exploded perspective view of an example stack-up configuration of the reflectarray configuration 100 of FIG. 1A in accordance with some implementations of the subject technology. The reflectarray configuration 100 is shown oriented with the x-y-z axis as illustrated. The reflectarray configuration 100 includes an antenna layer 110, a RFIC layer 120 and a polarizing grid layer 130. Not all of the depicted components may he required, however, and one or more implementations may include additional components not shown in the figure. Variations in the arrangement and type of the components may be made without departing from the scope of the claims as set forth herein. Additional components, different components, or fewer components may be provided.

The present disclosure is described with respect to a radar system, where the antenna structure 100 is a structure having a RF front-end module, such as the RFIC layer 120, with an array of transmission lines feeding a radiating array, such as the antenna layer 110.

The RFIC layer 120 includes a power routing layer 122 and a signal plane layer 124. The power routing layer 122 includes power supplies, such as DC power, and digital logic circuitry. The RFIC layer 120 may include multiple RFICs embedded into the signal plane layer 124, such as to correspond to the number of patch antennas in the antenna 112. For example, the signal plane layer 124 includes power amplifiers and transmit phase shift elements for a transmission chain and low-noise amplifiers and receive phase shift elements for a receiver chain. The signal plane layer 114 in the RFIC layer 120 may include, or be coupled to, a connector (not shown).

The phase shift elements in the signal plane layer 124 can be analog phase shifters (e.g., a varactor, a set of varactors, or a phase shift network) that can achieve any desired phase shift in a range of 0° to 160°. The signal plane layer 124 may also include transitions from the RFIC layer 120 to the antenna layer 110.

In some implementations, the power routing layer 122 includes a plurality of transmission lines coupled to power supplies and digital logic circuitry within conductive material and the antenna layer 110 is a lattice structure of unit cell radiating elements proximate the transmission lines. The power routing layer 122 may include a coupling module for providing an input signal to the transmission lines, or a portion of the transmission lines. In some implementations, the coupling module is a power divider circuit that divides the input signal among the plurality of transmission lines, in which the power may be distributed equally among the N transmission lines or may be distributed according to another scheme, such that the N transmission lines do not all receive a same signal strength.

In some implementations, the signal plane layer 124 includes a control circuit. The control circuit may include the reactance control mechanisms, or reactance controller, such as a variable capacitor, to change the reactance of a transmission circuit and thereby control the characteristics of the signal propagating through the transmission line. The reactance control mechanisms can act to change the phase of a signal radiated through individual antenna elements of the antenna layer 110. Where there is such an interruption in the transmission line, a transition is made to maintain signal flow in the same direction. Similarly, the reactance control mechanisms may utilize a control signal, such as a Direct Current (DC) bias line or other control means, to enable the reflectarray configuration 100 to control and adjust the reactance of the transmission line. In some implementations, the RFIC layer 120 includes one or more structures that isolate the control signal from the transmission signal. In the case of an antenna transmission structure, the reactance control mechanisms may serve as the isolation structure to isolate DC control signal(s) from Alternating Current (AC) transmission signals.

In some implementations, one or more of the layers in the RFIC layer 120 may include a substrate formed of a polytetrafluoroethylene material having predetermined parameters (e.g., low dielectric loss) that are applicable to high frequency circuits. In some aspects, a polytetrafluoroethylene substrate can exhibit thermal and phase stability across temperature and can be used in automotive radar and microwave applications.

The antenna layer 110 includes an antenna 112 and a ground plane layer 114. The antenna 112 may be a receive antenna or a transmit antenna in the antenna structure 100. The antenna 112 has a number of radiating elements creating paths for transmitted RF signals or reflections received from objects. In various examples, the radiating elements are meta-structures or patches in an array configuration such as in a 32-element transmit antenna or a 48-element receive antenna. For example, the antenna 112 may include an array of MTS elements. In another example, the antenna 112 may include an array of patch antennas.

The antenna layer 110 may be composed of individual radiating elements discussed herein. The antenna layer 110 may take a variety of forms and is designed to operate in coordination with the RFIC layer 120, in which individual radiating elements correspond to elements within the RFIC layer 120. As used herein, the "unit cell element" is referred to as an "MTS unit cell" or "MTS element," and these terms are used interchangeably throughout the present disclosure without departing from the scope of the subject technology. The MTS unit cells include a variety of conductive structures and patterns, such that a received transmission signal is radiated therefrom. The MTS unit cell may serve as an artificial material, meaning a material that is not naturally occurring. Each MTS unit cell has some unique properties. These properties include a negative permittivity and permeability resulting in a negative refractive index; these structures are commonly referred to as left-handed materials (LHM). The use of LHM enables behavior not achieved in classical structures and materials. The MTS array is a periodic arrangement of unit cells that are each smaller than the transmission wavelength. In some aspects, each of the unit cell elements has a uniform size and shape; however, alternate and other implementations may incorporate different sizes, shapes, configurations and array sizes.

The polarizing grid layer 130 includes a patterned grid that serves as a reflective surface to RF beams illuminated by the antenna layer 110 in a first polarization and serves as a transparent medium to RF beams illuminated by the antennas layer 110 in a second polarization different from the first polarization such that these RF beams propagate through the polarizing grid layer 130. The polarizing grid 130 is mechanically coupled to the antenna layer 110 by a structural support (not shown) in some implementations. The polarizing grid 130 is separated from the top surface of the antenna layer 110 by a predetermined distance. In this respect, the polarizing grid 130 and the antenna layer 130 are arranged substantially parallel to one another. The polarizing grid 130 may be fabricated with a dielectric substrate having a relatively thin conductive laminate on its surface that is patterned to form the patterned grid.

FIG. 2A illustrates a schematic diagram of a top view of the antenna layer 210 in the reflectarray configuration of FIG. 1A with a first reflectarray cell layout and a first feed element layout in accordance to various implementations of the subject technology. In some implementations, the first reflectarray 200 is rectangular and includes a rectangular grid of reflector elements 230. In the grid of reflector elements 230, each reflector element has a conforming orientation that also conforms with that of the feed elements 222, 224. The first reflectarray 200 may include a different shape with a grid having a different number of elements from that illustrated in FIG. 2A without departing from the scope of the present disclosure.

In some aspects, the array of feed elements are arranged laterally along the x-axis as one row of feed elements and laterally along the y-axis as one row of feed elements. For example, the feed elements may be equidistant from one another by a predetermined distance. In some aspects, the periodicity of the feed elements may vary from that illustrated in FIG. 1A without departing from the scope of the present disclosure. In some implementations, the array of feed elements is arranged in a region 220 of the first reflectarray 200 along the x-axis (e.g., feed elements 222) and y-axis (e.g., feed elements 224) such that the feed elements intersect at, or proximate to, the center of the first reflectarray 200. In some implementations, each feed element of the array of feed elements is coupled to a respective RFIC component in the RFIC layer 120. In this respect, the RFIC component can provide a gain and/or phase shifting to the outgoing feed signaling at the corresponding feed element. In other implementations, the array of feed elements is coupled to a shared RFIC component in the RFIC layer 120.

As depicted in FIG. 2A, a subarray of feed elements (e.g., 3 feed elements) are arranged along the x- and y-axes such that the feed elements do not reach the periphery of the first reflectarray 200 surface and instead cells are patterned on the first reflectarray 200 surface between the array of feed elements and the periphery of the first reflectarray 200. In this respect, the array of feed elements occupies the region 220 of the first reflectarray 200 surface such that RF beams illuminated by the feed elements are radiated toward the intended location on the polarizing grid 130. The location of the feed elements may vary without departing from the scope of the present disclosure.

FIG. 2B illustrates a schematic diagram of a top view of another example of the antenna layer 210 in the first reflectarray 250 of FIG. 1A in accordance to various implementations of the subject technology. As depicted in FIG. 1C, the array of feed elements is arranged laterally across the entire first reflectarray 250 surface as one row in both axes such that both rows of feed elements extend edge-to-edge and intersect at the center of the first reflectarray 250 surface. For example, feed elements 262 extend laterally along the x-axis and feed elements 264 extend laterally along the y-axis within a region 260. In this respect, a subset of reflector elements (e.g., 252) is arranged at each quadrant on the first reflectarray 250 surface. As illustrated in FIG. 2B, the number of feed elements is equivalent in both axes. The number of feed elements in each of the axes may be equivalent in some implementations, or the number of feed elements in each of the axes may be different in other implementations, without departing from the scope of the present disclosure.

In some implementations, a number of feed elements may serve as dummy elements, in which the feed element is inactive by a corresponding RFIC component. For example, the feed elements 262 and 264 are coupled to RFIC components in the RFIC layer 120, and can be activated individually by its corresponding RFIC component. In this respect, an RFIC component may activate and drive transmit signaling through a PA to a corresponding feed element. Conversely, an RFIC component may activate and receive return signaling through an LNA from a corresponding feed element operating as a receive antenna.

Figure 6:
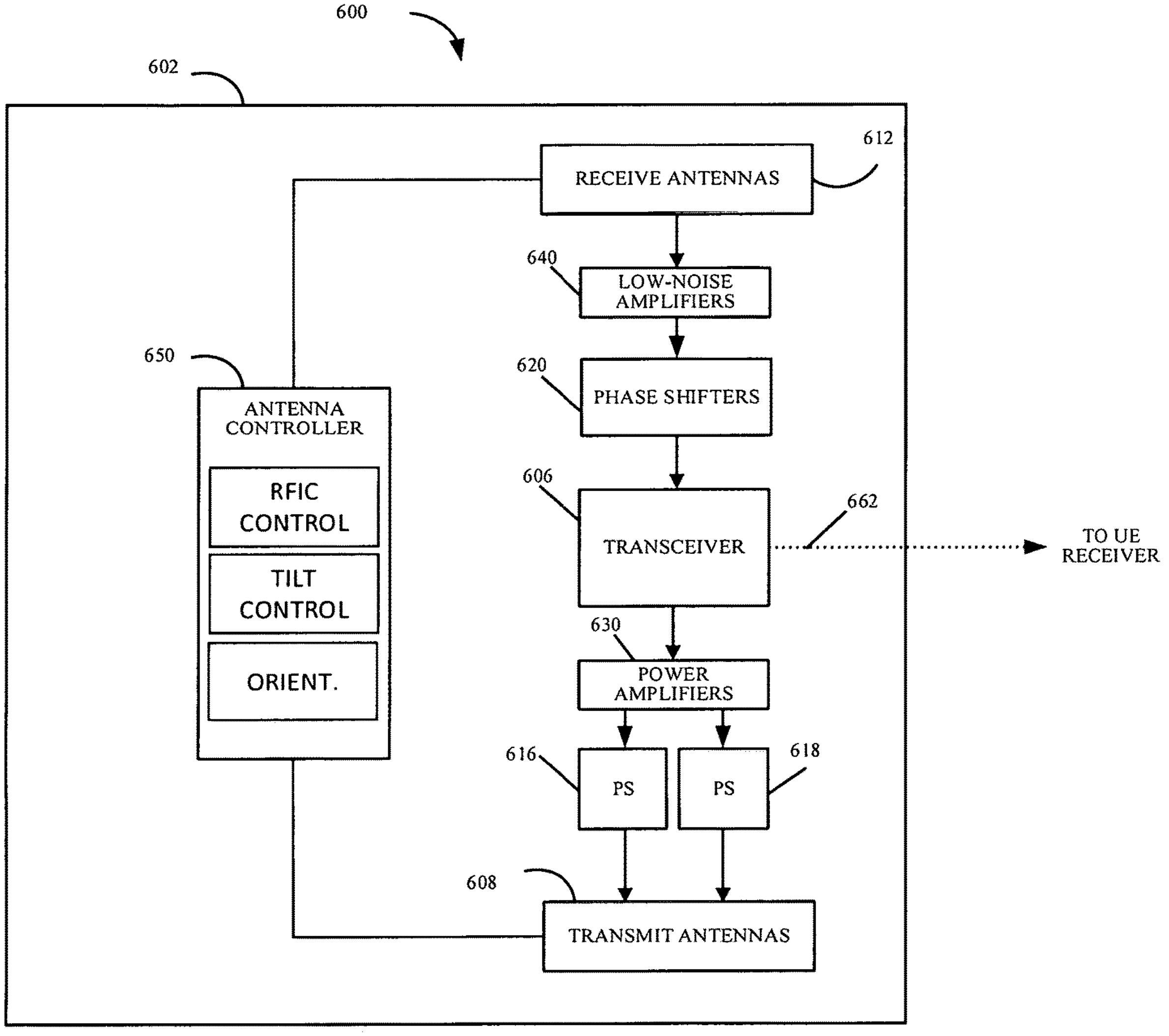
FIG. 6 illustrates a schematic diagram of an antenna system in accordance with various implementations of the subject technology.

In other implementations, the feed elements can be reprogrammable to operate as transmit antenna elements or as receive antenna elements using the corresponding RFIC components. For example, the feed elements 262 can be programmed to operate as the transmit feed elements using the PAs in the RFIC layer 120, whereas the feed elements 264 can be programmed to operate as the receive antenna elements using the LNAs in the RFIC layer 120. In other examples, a first subset of the feed elements 262 can be programmed to operate as the transmit feed elements, whereas a remaining subset of the feed elements 262 can be programmed to operate as the receive antenna elements. As illustrated in FIG. 6, an antenna controller 650 is positioned to control operation of the antenna systems as described herein. The antenna controller 650 enables the change of operation from receive to transmit and is adapted to conduct tilt control of elements, RFIC control of analog and other components and orientation of reflect arrays.

FIG. 3A illustrates a schematic diagram of a top view of the antenna layer in the reflectarray configuration of FIG. 1A with a second reflectarray cell layout and a first feed element layout in accordance to various implementations of the subject technology. As depicted in FIG. 3A, a subarray of feed elements 310 (e.g., 3 feed elements) are arranged along the x- and y-axes such that the feed elements 310 do not reach the periphery of the first reflectarray 300 surface and instead cells 320 are patterned on the first reflectarray 300 surface between the array of feed elements and the periphery of the first reflectarray 300. The cells 320 include an orientation that is non-orthogonal with the feed elements 310. For example, the cells 320 may be oriented by a predetermined angle (e.g., 45°) relative to the feed elements 310 in some implementations, or relative to elements in the polarizing grid layer 130 in other implementations. The cells 320 may include cells with a uniform orientation and different sizes within a quadrant of the reflectarray surface (for each quadrant). In this respect, the orientation of the cells (or reflector elements) may be different across the different quadrants in some implementations, or may be uniform across the quadrants in other implementations.

FIG. 3B illustrates a schematic diagram of a top view of another example of the antenna layer in the reflectarray configuration of FIG. 1A with a second reflectarray cell layout and a second feed element layout in accordance to various implementations of the subject technology. As depicted in FIG. 3B, the array of feed elements is arranged laterally across the entire first reflectarray 350 surface as one row in both axes such that both rows of feed elements extend edge-to-edge and intersect at the center of the first reflectarray 350 surface. For example, feed elements 362 extend laterally along the x-axis and feed elements 364 extend laterally along the y-axis. In this respect, a subset of reflector elements (e.g., 370) is arranged at each quadrant on the first reflectarray 350 surface with a layout containing cells with a uniform orientation and different sizes.

FIG. 4A illustrates a schematic diagram of a top view of a polarizing grid layer 400 in the reflectarray configuration of FIG. 1A with a first polarizing layout in accordance to various implementations of the subject technology. The polarizing grid layer 400 includes a rectangular grid of patterned elements 402 arranged in rows and columns on a bottom surface (e.g., surface directly opposing the top surface of the antenna layer 110). The patterned elements 402 may include a conductive material used to produce a reflective surface in a first polarization and a transparent surface in the other polarization. In some examples, the first polarization may run parallel with the y-axis and the second polarization may run parallel with the x-axis. The patterned elements 402 may include a rectangular shape with the width dimension along the x-axis and length dimension along the y-axis. The patterned elements 402 may have a periodicity that corresponds to that of the reflector elements in the antenna layer 110.

FIG. 4B illustrates a schematic diagram of a top view of another example of a polarizing grid layer 450 in the reflectarray configuration of FIG. 1A with a second polarizing layout in accordance to various implementations of the subject technology. The polarizing grid layer 450 includes columns of patterned elements 452 along the x-axis. Although the polarizing grid layer 450 includes columnar elements that extend laterally across the entire surface in the y-axis, the patterned elements 450 may produce a similar performance as that of the patterned elements 402 in the polarizing grid layer 400.

Attention is now directed to FIG. 5, which illustrates a schematic diagram of a reflectarray antenna 500 with various cell configurations in accordance to various implementations of the subject technology. The reflectarray antenna 500 includes an array of cells organized in rows and columns. The reflectarray antenna 500 provides directivity and high bandwidth and gain due to the size and configuration of its individual cells and the individual reflector elements within those cells.

In various examples, the cells in the reflectarray antenna 500 include MTS-based reflector elements. In other examples, the reflectarray cells may be composed of microstrips, gaps, patches, dipoles, and so forth. Various configurations, shapes, and dimensions may be used to implement specific designs and meet specific constraints. As illustrated, reflectarray antenna 500 is a rectangular reflectarray with a length l and a width w. In other examples, the reflectarray antenna 500 may be circular with a radius r. Each cell in the reflectarray antenna 500 has a reflector element. The reflector elements may also have different configurations, such as a square reflector element, a rectangular reflector element, a dipole reflector element, a miniature reflector element, and so on. Other shapes (e.g., trapezoid, hexagon, etc.) may also be designed to satisfy design criteria for a given 5G or other wireless application, such as the location of the reflectarray antenna 500 relative to a BS, the desired gain and directivity performance, and so on.

For example, the reflectarray antenna 500 includes a cell 502 that is a rectangular cell with dimensions $w_c$ and $l_c$ for its width and length, respectively. The cell 502 includes a reflector element 504 with dimensions $w_{re}$ and $l_{re}$. The dimensions of the reflector element are in the sub-wavelength range (~λ/3), with λ indicating the wavelength of its incident or reflected RF signals.

In some implementations, the working frequency is in a range of 27.5 GHz to 28.5 GHz for 5G applications, and more particular, at a center frequency of about 28 GHz. The periodicity of the cells is in a range of 3.0 mm to 5.0 mm in both axes (e.g., x, y), which is less than half a wavelength at a working frequency of about 58 GHz to avoid grating lobes. The length of the cell may be in a range of 3.0 mm to 5.0 mm, and the width of the cell may be in a range of 3.0 mm to 5.0 mm. In other implementations, the working frequency is in a range of 76.5 GHz to 77.5 GHz for radar applications, and more particular, at a center frequency of about 77 GHz. The periodicity of the cells is in a range of 1.8 mm to 5.0 mm in both axes (e.g., x, y), which is about half a wavelength at a working frequency of about 77 GHz. The length of the cell may be in a range of 1.5 mm to 5.5 mm, and the width of the cell may be in a range of 1.5 mm to 5.5 mm.

In other examples, the reflectarray antenna 500 includes a cell 506 that has a dipole element 508. In still other examples, the reflectarray antenna 500 includes a cell 510 that has a miniature reflector element 512, which is effectively a significantly small dot in an etched or pattern PCB metal layer that may be imperceptible to the human eye. As described in more detail below, the design of the reflectarray antenna 500 is driven by geometrical considerations for a given application or deployment, whether indoors or outdoors. The dimensions, shape and cell configuration of the reflectarray antenna 500 will therefore depend on the particular application.

FIG. 6 illustrates a schematic diagram of a radar system 600 in accordance with various implementations of the subject technology. Radar module 602 is capable of both transmitting RF signals within a FoV and receiving the reflections of the transmitted signals as they reflect off of objects in the FoV. With the use of analog beamforming in radar module 602, a single transmit and receive chain can be used effectively to form a directional, as well as a steerable, beam. A transceiver 606 in radar module 602 is adapted to generate signals for transmission through transmit antennas 608 as well as manage signals received through receive antennas 612. Beam steering within the FoV is implemented with phase shifter (PS) circuits 616-618 coupled to the transmit antennas 608 on the transmit chain and PS circuit 620 coupled to the receive antennas 612 on the receive chain, respectively. In some implementations, the transmit antennas 608 and receive antennas 612 are mechanically coupled to a polarizing grid (e.g., 120 of FIG. 1A). In this respect, RF beams can be transmitted and received in the manner described in FIG. 1A.

The use of PS circuits 616-618 and 620 enables separate control of the phase of each element in the transmit and receive antennas. Unlike early passive architectures, the beam is steerable not only to discrete angles but to any angle (i.e., from 0° to 360°) within the FoV using active beamforming antennas. A multiple element antenna can be used with an analog beamforming architecture where the individual antenna elements may be combined or divided at the port of the single transmit or receive chain without additional hardware components or individual digital processing for each antenna element. Further, the flexibility of multiple element antennas allows narrow beam width for transmit and receive. The antenna beam width decreases with an increase in the number of antenna elements. A narrow beam improves the directivity of the antenna and provides the radar system 600 with a significantly longer detection range.

The major challenge with implementing analog beam steering is to design PSs to operate at 77 GHz. PS circuits 616-618 and 620 solve this problem with a reflective PS design implemented with a distributed varactor network currently built using Gallium-Arsenide (GaAs) materials. Each PS circuit 616-618 and 620 has a series of PSs, with each PS coupled to an antenna element to generate a phase shift value of anywhere from 0° to 360° for signals transmitted or received by the antenna element. The PS design is scalable in future implementations to other semiconductor materials, such as Silicon-Germanium (SiGe) and CMOS, bringing down the PS cost to meet specific demands of customer applications.

In some implementations, one or more of PS circuit 616-618 and 620 may be controlled by a Field Programmable Gate Array (FPGA) (not shown), which provides a series of voltages to the PSs in each PS circuit that results in a series of phase shifts. In various examples, a voltage value is applied to each PS in the PS circuits 616-618 and 620 to generate a given phase shift and provide beam steering. The voltages applied to the PSs in PS circuits 616-618 and 620 may be stored in Look-up Tables (LUTs) in the FPGA. These LUTs may be generated by an antenna calibration process that determines which voltages to apply to each PS to generate a given phase shift under each operating condition. In some aspects, the PSs in PS circuits 616-618 and 620 can generate phase shifts at a very high resolution of less than one degree. This enhanced control over the phase allows the transmit and receive antennas in radar module 602 to steer beams with a very small step size, improving the capability of the radar system 600 to resolve closely located targets at small angular resolution.

In various examples, the transmit antennas 608 and the receive antennas 612 may be a meta-structure antenna, a phase array antenna, or any other antenna capable of radiating RF signals in millimeter wave frequencies. A meta-structure, as generally defined herein, is an engineered structure capable of controlling and manipulating incident radiation at a desired direction based on its geometry. Various configurations, shapes, designs and dimensions of the antennas 608 and 612 may be used to implement specific designs and meet specific constraints.

The transmit chain in radar system 600 starts with the transceiver 606 generating RF signals to prepare for transmission over-the-air by the transmit antennas 608. The RF signals may be, for example, Frequency-Modulated Continuous Wave (FMCW) signals. An FMCW signal enables the radar system 600 to determine both the range to an object and the object's velocity by measuring the differences in phase or frequency between the transmitted signals and the received/reflected signals or echoes. Within FMCW formats, there are a variety of waveform patterns that may be used, including sinusoidal, triangular, sawtooth, rectangular and so forth, each having advantages and purposes.

Once the FMCW signals are generated by the transceiver 606, they are provided to power amplifiers (PAs) 630. Signal amplification is needed for the FMCW signals to reach the long ranges desired for object detection, as the signals attenuate as they radiate by the transmit antennas 608. Each signal from the PAs 630 is then input into a PS in PS circuits 616-618, where they are phase shifted based on voltages applied to the PS circuits 616-618 and then transmitted through transmit antennas 608.

In various examples and as described in more detail below, radar system 600 operates in one of various modes, including a full scanning mode and a selective scanning mode, among others. In a full scanning mode, both transmit antennas 608 and receive antennas 612 scan a complete FoV with small incremental steps. Even though the FoV may be limited by system parameters due to increased side lobes as a function of the steering angle, radar system 600 is able to detect objects over a significant area for a long-range radar. The range of angles to be scanned on either side of boresight as well as the step size between steering angles/phase shifts can be dynamically varied based on the driving environment. To improve performance of an autonomous vehicle (e.g., an ego vehicle) driving through an urban environment, the scan range can be increased to keep monitoring the intersections and curbs to detect vehicles, pedestrians or bicyclists. This wide scan range may deteriorate the frame rate (revisit rate), but is considered acceptable as the urban environment generally involves low velocity driving scenarios. For a high-speed freeway scenario, where the frame rate is critical, a higher frame rate can be maintained by reducing the scan range. In this case, a few degrees of beam scanning on either side of the boresight would suffice for long-range target detection and tracking.

In a selective scanning mode, the radar system 600 scans around an area of interest by steering to a desired angle and then scanning around that angle. This ensures the radar system 600 is to detect objects in the area of interest without wasting any processing or scanning cycles illuminating areas with no valid objects. Since the radar system 600 can detect objects at a long distance, e.g., 300 m or more at boresight, if there is a curve in a road, direct measures do not provide helpful information. Rather, the radar system 600 steers along the curvature of the road and aligns its beams towards the area of interest. In various examples, the selective scanning mode may be implemented by changing the chirp slope of the FMCW signals generated by the transceiver 606 and by shifting the phase of the transmitted signals to the steering angles needed to cover the curvature of the road.

Objects are detected with radar system 600 by reflections or echoes that are received at receive antennas 612, which are directed by PS circuits 620. Low Noise Amplifiers (LNAs) 640 are positioned between receive antennas 612 and PS circuits 620, which include PSs similar to the PSs in PS circuits 616-618. For receive operation, PS circuits 620 create phase differentials between radiating elements in the receive antennas 612 to compensate for the time delay of received signals between radiating elements due to spatial configurations. Receive phase-shifting, also referred to as analog beamforming, combines the received signals for aligning echoes to identify the location, or position of a detected object. That is, phase shifting aligns the received signals that arrive at different times at each of the radiating elements in receive antennas 612. Similar to PS circuits 616-618 on the transmit chain, PS circuits 620 may be biased with a voltage to each PS to generate the desired phase shift.

The receive chain then combines the signals received at receive antennas 612, from which the combined signals propagate to the transceiver 606. In one example, receive antennas 612 include 68 radiating elements. Other examples may include 8, 26, 34, 62, and so on, depending on the desired configuration. The higher the number of antenna elements, the narrower the beam width.

Once the received signals are received by transceiver 606, the received signals are either (1) rerouted through the transmission chain for transmission with the transmit antennas 608, or (2) provided to a user equipment ("UE") receiver by the transceiver 606 for receiver processing. In some implementations, the receiver chain is directly coupled to the transmitter chain through the transceiver 606. In other implementations, the receiver chain is directly coupled to an output port that feeds to the UE receiver (and not rerouted through the transmission chain). In still other implementations, the transceiver 606 is coupled to both the transmitter chain and the output to the UE receiver, and the transceiver 606 includes control circuitry, such that the transceiver 606 can select between driving the received signals to the transmitter chain or to the UE receiver.

In various examples described herein, the use of radar system 600 in an autonomous driving vehicle provides a reliable way to detect targets in difficult weather conditions. For example, historically a driver will slow down dramatically in thick fog, as the driving speed decreases along with decreases in visibility. On a highway in Europe, for example, where the speed limit is 515 km/h, a driver may need to slow down to 50 km/h when visibility is poor. Using the radar system 600, the driver (or driverless vehicle) may maintain the maximum safe speed without regard to the weather conditions. Even if other drivers slow down, a vehicle enabled with the radar system 600 can detect those slow-moving vehicles and obstacles in its path and avoid/navigate around them.

Figure 7:
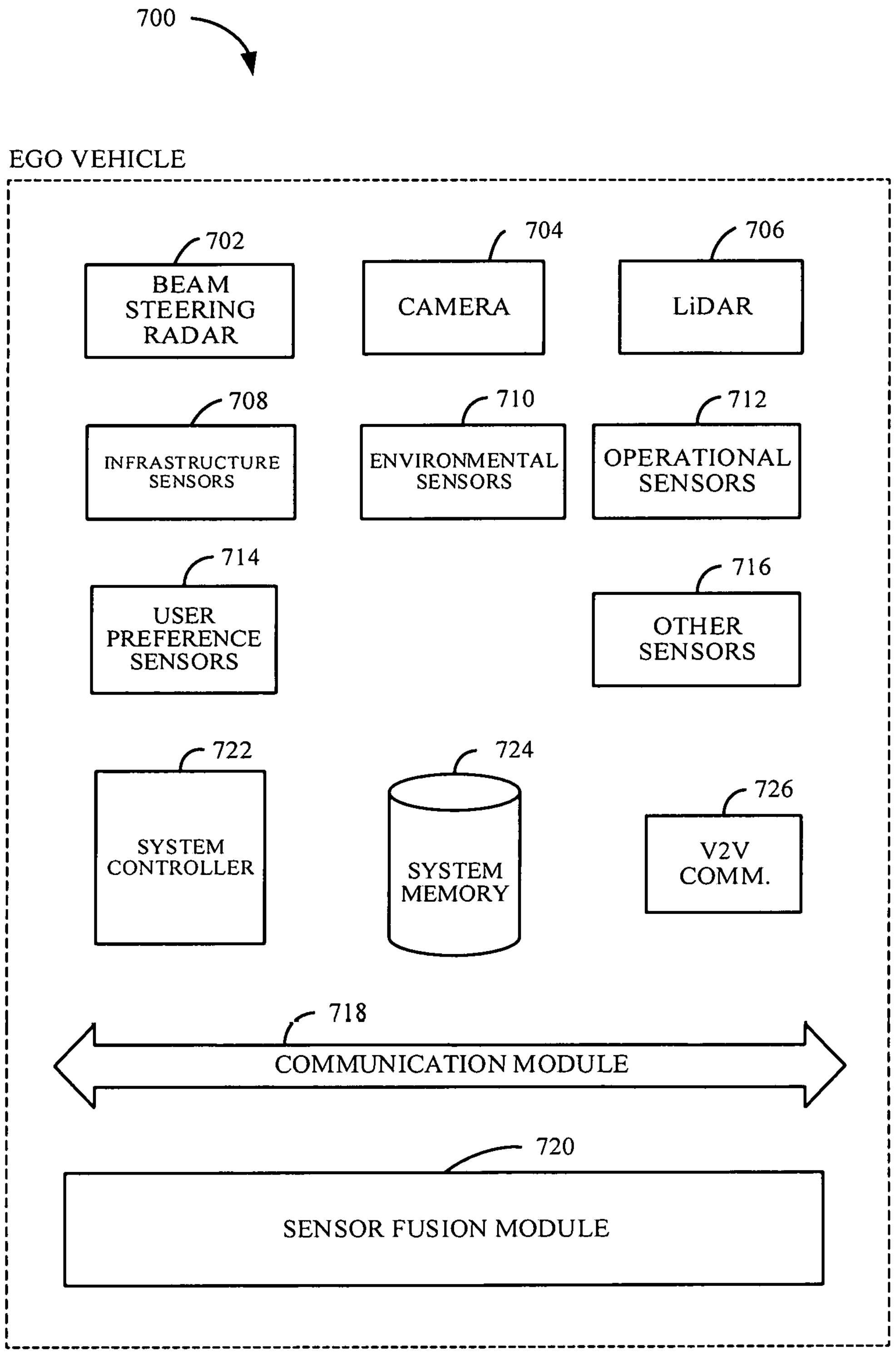
FIG. 7 illustrates a schematic diagram of an autonomous driving system for an ego vehicle in accordance with various implementations of the subject technology.

Attention is now directed to FIG. 7, which illustrates a schematic diagram of an autonomous driving system 700 for an ego vehicle in accordance with various implementations of the subject technology. The autonomous driving system 700 is a system for use in an ego vehicle that provides some or full automation of driving functions. The driving functions may include, for example, steering, accelerating, braking, and monitoring the surrounding environment and driving conditions to respond to events, such as changing lanes or speed when needed to avoid traffic, crossing pedestrians, animals, and so on. The autonomous driving system 700 includes a beam steering radar system 702 and other sensor systems such as camera 704, lidar 706, infrastructure sensors 708, environmental sensors 710, operational sensors 712, user preference sensors 714, and other sensors 716. The autonomous driving system 700 also includes a communications module 718, a sensor fusion module 720, a system controller 722, a system memory 724, and a Vehicle-to-Vehicle (V2V) communications module 726. It is appreciated that this configuration of the autonomous driving system 700 is an example configuration and not meant to be limiting to the specific structure illustrated in FIG. 7. Additional systems and modules not shown in FIG. 7 may be included in autonomous driving system 700.

In various examples, the beam steering radar 702 includes at least one beam steering antenna for providing dynamically controllable and steerable beams that can focus on one or multiple portions of a 360° FoV of the vehicle. The beams radiated from the beam steering antenna are reflected back from objects in the vehicle's path and surrounding environment and received and processed by the radar 702 to detect and identify the objects. The radar 702 includes a perception module that is trained to detect and identify objects and control the radar module as desired. The camera 704 and lidar 706 may also be used to identify objects in the path and surrounding environment of the ego vehicle, albeit at a much lower range.

Infrastructure sensors 708 may provide information from infrastructure while driving, such as from a smart road configuration, billboard information, traffic alerts and indicators, including traffic lights, stop signs, traffic warnings, and so forth. This is a growing area, and the uses and capabilities derived from this information are immense. Environmental sensors 710 detect various conditions outside, such as temperature, humidity, fog, visibility, precipitation, among others. Operational sensors 712 provide information about the functional operation of the vehicle. This may be tire pressure, fuel levels, brake wear, and so forth. The user preference sensors 714 may detect conditions that are part of a user preference. This may be temperature adjustments, smart window shading, etc. Other sensors 716 may include additional sensors for monitoring conditions in and around the ego vehicle.

In various examples, the sensor fusion module 720 optimizes these various functions to provide an approximately comprehensive view of the ego vehicle and environments. Many types of sensors may be controlled by the sensor fusion module 720. These sensors may coordinate with each other to share information and consider the impact of one control action on another system. In one example, in a congested driving condition, a noise detection module (not shown) may identify that there are multiple radar signals that may interfere with the vehicle. This information may be used by a perception module in the radar 702 to adjust the scan parameters of the radar 702 to avoid these other signals and minimize interference.

In another example, environmental sensor 710 may detect that the weather is changing, and visibility is decreasing. In this situation, the sensor fusion module 720 may determine to configure the other sensors to improve the ability of the vehicle to navigate in these new conditions. The configuration may include turning off the camera 704 and/or the lidar 706, or reducing the sampling rate of these visibility-based sensors. This effectively places reliance on the sensor(s) adapted for the current situation. In response, the perception module configures the radar 702 for these conditions as well. For example, the radar 702 may reduce the beam width to provide a more focused beam, and thus a finer sensing capability.

In various examples, the sensor fusion module 720 may send a direct control to the radar 702 based on historical conditions and controls. The sensor fusion module 720 may also use some of the sensors within the autonomous driving system 700 to act as feedback or calibration for the other sensors. In this way, the operational sensor 712 may provide feedback to the perception module and/or to the sensor fusion module 720 to create templates, patterns and control scenarios. These are based on successful actions or may be based on poor results, where the sensor fusion module 720 learns from past actions.

Data from the sensors 702, 704, 706, 708, 710, 712, 714, 716 may be combined in the sensor fusion module 720 to improve the target detection and identification performance of autonomous driving system 700. The sensor fusion module 720 may itself be controlled by the system controller 722, which may also interact with and control other modules and systems in the ego vehicle. For example, the system controller 722 may power on or off the different sensors 702, 704, 706, 708, 710, 712, 714, 716 as desired, or provide instructions to the ego vehicle to stop upon identifying a driving hazard (e.g., deer, pedestrian, cyclist, or another vehicle suddenly appearing in the vehicle's path, flying debris, etc.)

All modules and systems in the autonomous driving system 700 communicate with each other through the communication module 718. The system memory 724 may store information and data (e.g., static and dynamic data) used for operation of the autonomous driving system 700 and the ego vehicle using the autonomous driving system 700. The V2V communications module 726 is used for communication with other vehicles. The V2V communications module 726 may also obtain information from other vehicles that is non-transparent to the user, driver, or rider of the ego vehicle, and may help vehicles coordinate with one another to avoid any type of collision.

Figure 8:
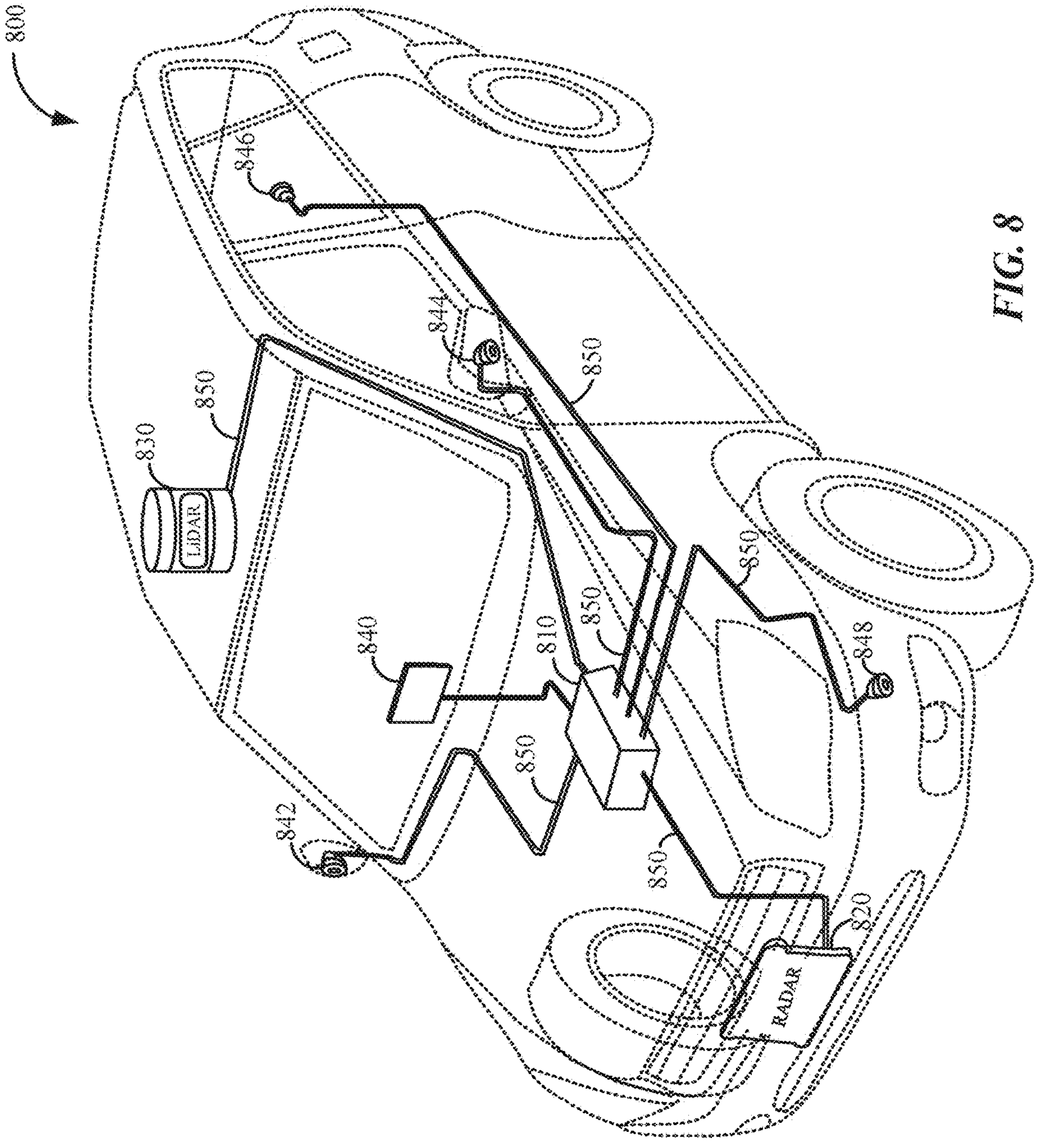
FIG. 8 illustrates an example network environment in which a radar system may be implemented in accordance with one or more implementations of the subject technology.

FIG. 8 illustrates an example network environment 800 in which a radar system may be implemented in accordance with one or more implementations of the subject technology. The example network environment 800 includes a number of electronic devices 820, 830, 840, 842, 844, 846, and 848 that are coupled to an electronic device 810 via the transmission lines 850. The electronic device 810 may communicably couple the electronic devices 842, 844, 846, 848 to one another. In one or more implementations, one or more of the electronic devices 842, 844, 846, 848 are communicatively coupled directly to one another, such as without the support of the electronic device 810. Not all of the depicted components may be required, however, and one or more implementations may include additional components not shown in the figure. Variations in the arrangement and type of the components may be made without departing from the scope of the claims as set forth herein. Additional components, different components, or fewer components may be provided.

In some implementations, one or more of the transmission lines 850 are Ethernet transmission lines. In this respect, the electronic devices 820, 830, 840, 842, 844, 846, 848 and 810 may implement a physical layer (PHY) that is interoperable with one or more aspects of one or more physical layer specifications, such as those described in the Institute of Electrical and Electronics Engineers (IEEE) 802.3 Standards (e.g., 802.3ch). The electronic device 810 may be, or may include, a switch device, a routing device, a hub device, or generally any device that may communicably couple the electronic devices 820, 830, 840, 842, 844, 846, and 848.

In one or more implementations, at least a portion of the example network environment 800 is implemented within a vehicle, such as a passenger car. For example, the electronic devices 842, 844, 846, 848 may include, or may be coupled to, various systems within a vehicle, such as a powertrain system, a chassis system, a telematics system, an entertainment system, a camera system, a sensor system, such as a lane departure system, a diagnostics system, or generally any system that may be used in a vehicle. In FIG. 8, the electronic device 810 is depicted as a central processing unit, the electronic device 820 is depicted as a radar system, the electronic device 830 is depicted as a LiDAR system, the electronic device 840 is depicted as an entertainment interface unit, and the electronic devices 842, 844, 846, 848 are depicted as camera devices, such as forward-view, rear-view and side-view cameras. In one or more implementations, the electronic device 810 and/or one or more of the electronic devices 842, 844, 846, 848 may be communicatively coupled to a public communication network, such as the Internet.

Figure 9:
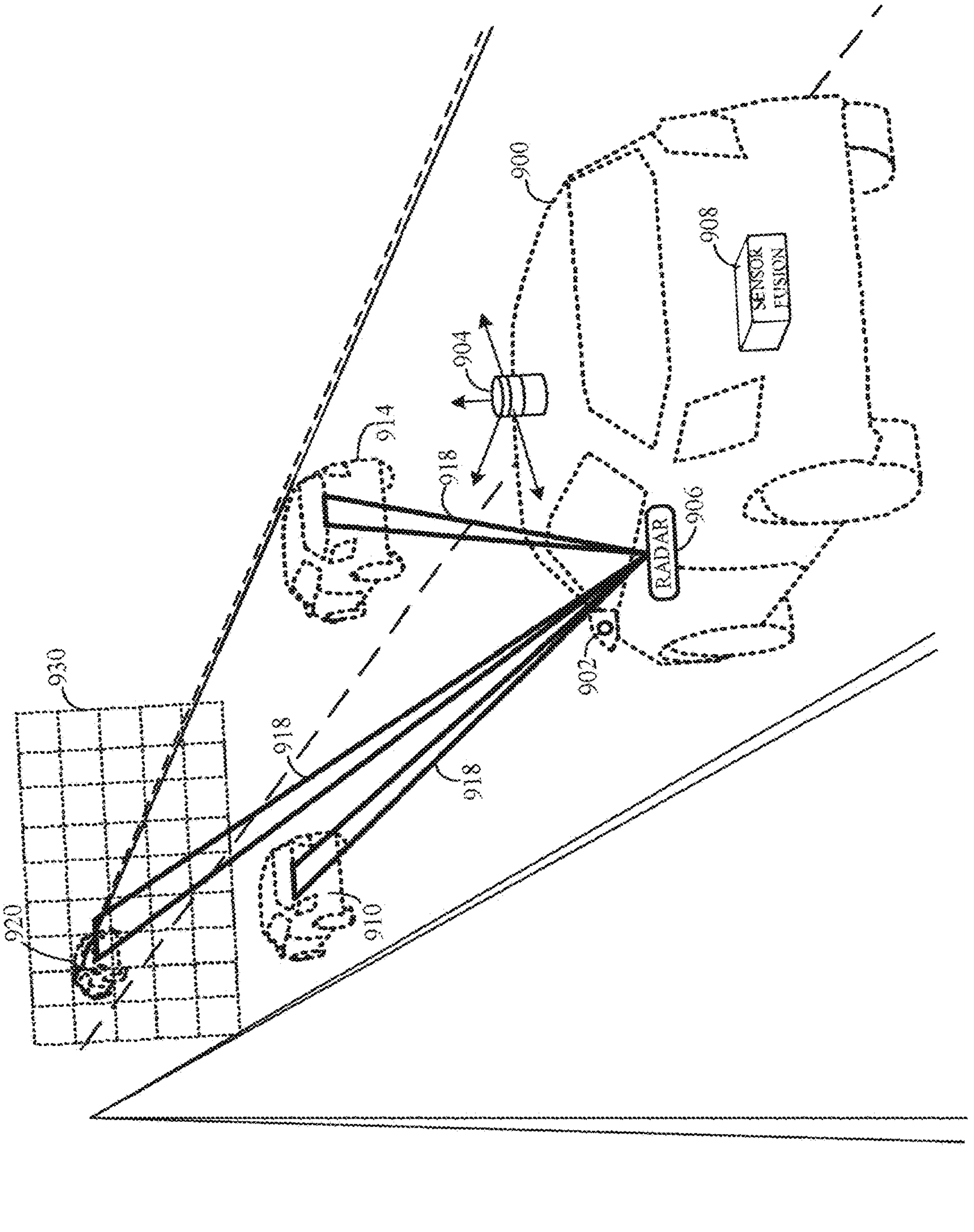
FIG. 9 illustrates an example environment in which a beam steering radar in an autonomous vehicle is used to detect and identify objects, according to various implementations of the subject technology.

FIG. 9 illustrates an example environment in which a beam steering radar in an autonomous vehicle is used to detect and identify objects, according to various implementations of the subject technology. Ego vehicle 900 is an autonomous vehicle with a beam steering radar system 906 for transmitting a radar signal to scan a FoV or specific area. As described in more detail below, the radar signal is transmitted according to a set of scan parameters that can be adjusted to result in multiple transmission beams 918. The scan parameters may include, among others, the total angle of the scanned area defining the FoV, the beam width or the scan angle of each incremental transmission beam, the number of chirps in the radar signal, the chirp time, the chirp segment time, the chirp slope, and so on. The entire FoV or a portion of it can be scanned by a compilation of such transmission beams 918, which may be in successive adjacent scan positions or in a specific or random order. Note that the term FoV is used herein in reference to the radar transmissions and does not imply an optical FoV with unobstructed views. The scan parameters may also indicate the time interval between these incremental transmission beams, as well as start and stop angle positions for a full or partial scan.

In various examples, the ego vehicle 900 may also have other perception sensors, such as a camera 902 and a lidar 904. These perception sensors are not required for the ego vehicle 900, but may be useful in augmenting the object detection capabilities of the beam steering radar 906. The camera 902 may be used to detect visible objects and conditions and to assist in the performance of various functions. The lidar 904 can also be used to detect objects and provide this information to adjust control of the ego vehicle 900. This information may include information such as congestion on a highway, road conditions, and other conditions that would impact the sensors, actions or operations of the vehicle. Existing ADAS modules utilize camera sensors to assist drivers in driving functions such as parking (e.g., in rear view cameras). Cameras are able to capture texture, color and contrast information at a high level of detail, but similar to the human eye, they are susceptible to adverse weather conditions and variations in lighting. The camera 902 may have a high resolution but may not resolve objects beyond 50 meters.

Lidar sensors typically measure the distance to an object by calculating the time taken by a pulse of light to travel to an object and back to the sensor. When positioned on top of a vehicle, a lidar sensor can provide a 360° 3D view of the surrounding environment. Other approaches may use several lidars at different locations around the vehicle to provide the full 360° view. However, lidar sensors such as lidar 904 are still prohibitively expensive, bulky in size, sensitive to weather conditions and are limited to short ranges (e.g., less than 150-300 meters). Radars, on the other hand, have been used in vehicles for many years and operate in all-weather conditions. Radar sensors also use far less processing than the other types of sensors and have the advantage of detecting objects behind obstacles and determining the speed of moving objects. When it comes to resolution, the laser beams emitted by the lidar 904 are focused on small areas, have a smaller wavelength than RF signals, and can achieve around 0.25 degrees of resolution.

In various examples and as described in more detail below, the beam steering radar 906 can provide a 360° true 3D vision and human-like interpretation of the path and surrounding environment of the ego vehicle 900. The beam steering radar 906 is capable of shaping and steering RF beams in all directions in a 360° FoV with at least one beam steering antenna and recognize objects quickly and with a high degree of accuracy over a long range of around 300 meters or more. The short-range capabilities of the camera 902 and the lidar 904 along with the long-range capabilities of the radar 906 enable a sensor fusion module 908 in the ego vehicle 900 to enhance its object detection and identification.

As illustrated, the beam steering radar 906 can detect both vehicle 920 at a far range (e.g., greater than 350 m) as well as vehicles 910 and 914 at a short range (e.g., lesser than 100 m). Detecting both vehicles in a short amount of time and with enough range and velocity resolution is imperative for full autonomy of driving functions of the ego vehicle. The radar 906 has an adjustable Long-Range Radar (LRR) mode that enables the detection of long-range objects in a very short time to then focus on obtaining finer velocity resolution for the detected vehicles. Although not described herein, radar 906 is capable of time-alternatively reconfiguring between LRR and Short-Range Radar (SRR) modes. The SRR mode enables a wide beam with lower gain, but is able to make quick decisions to avoid an accident, assist in parking and downtown travel, and capture information about a broad area of the environment. The LRR mode enables a narrow, directed beam and long distance, having high gain; this is powerful for high speed applications, and where longer processing time allows for greater reliability. Excessive dwell time for each beam position may cause blind zones, and the adjustable LRR mode ensures that fast object detection can occur at long range while maintaining the antenna gain, transmit power and desired Signal-to-Noise Ratio (SNR) for the radar operation.

Figure 10:
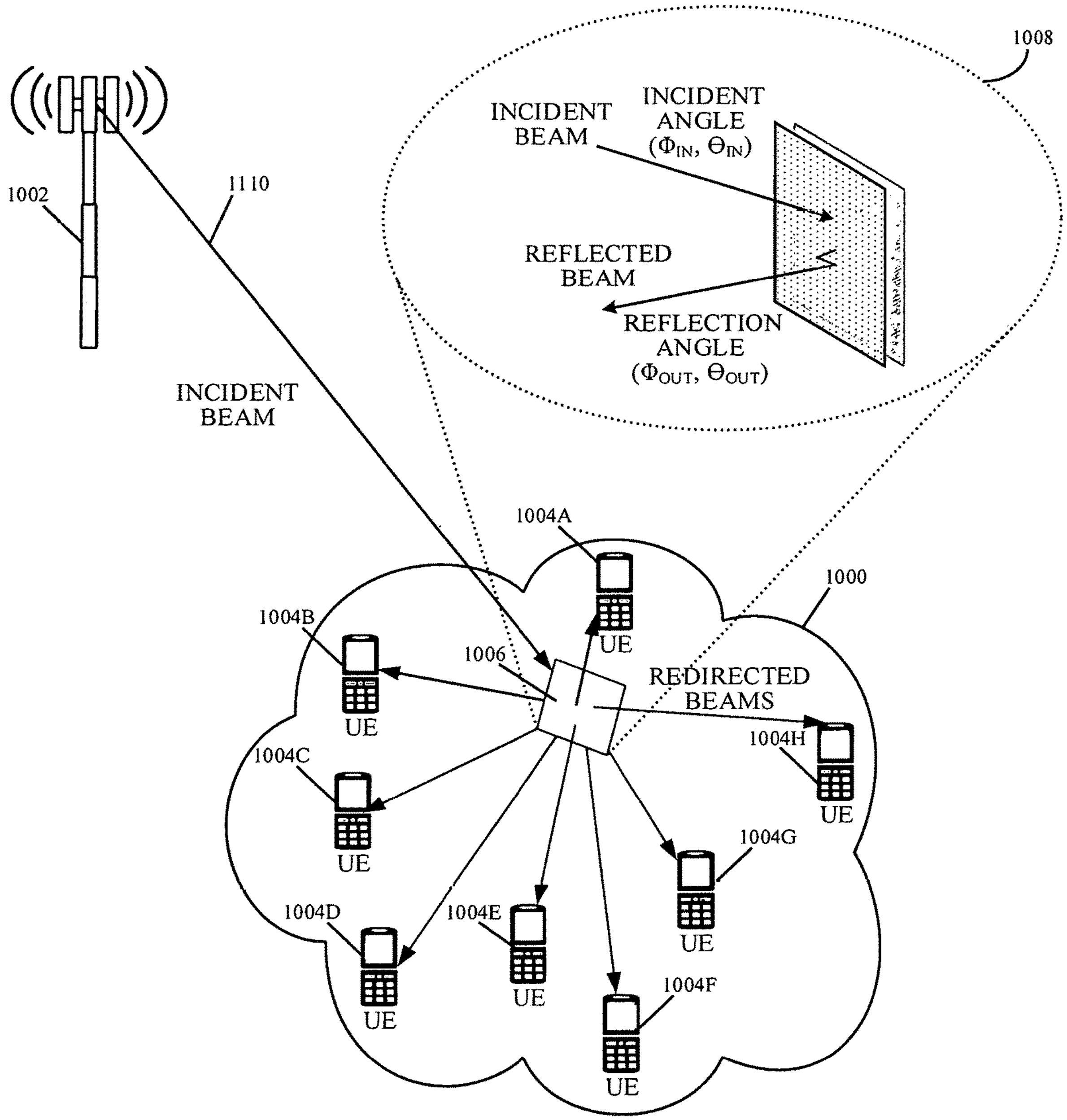
FIG. 10 illustrates an environment in which a reflectarray antenna is deployed to enhance wireless communications in accordance with various implementations of the subject technology.

FIG. 10 illustrates an environment in which a reflectarray antenna is deployed to enhance wireless communications in accordance with various implementations of the subject technology. Wireless network 1000 serves UE within transmission and reception range of at least one wireless base station ("BS"), such as BS 1002. BS 1002 transmits and receives wireless signals from UE within its coverage area, such as UE 1004A-H. The coverage area may be disrupted by buildings or other structures in the environment, which may affect the quality of the wireless signals. As described in more detail below, wireless coverage for UE 1004A-H can be significantly improved by the installation of a reflectarray antenna 1006 within their vicinity. The reflectarray antenna 1006 is, or includes at least a portion of, the reflectarray configuration 100 of FIGS. 1A-1C. Although a single reflectarray antenna 1006 is shown for illustration purposes, multiple such reflectarray antennas may be placed in wireless network 1000 as desired.

In various examples, the reflectarray antenna 1006 can serve as an active relay between BS 1002 and UE 1004A-H. The reflectarray antenna 1006 receives a signal from the BS 1002 at an incident angle (or direction) and reflects the signal into one or more directional beams aimed for the UE 1004A-H. As depicted in FIG. 10, cutout 1008 shows the reflectarray antenna 1006 with two reflectarrays, where a first reflectarray has reflector elements with coplanar feed elements and a polarizing grid that serves as a second reflectarray to pass RF beams reflected from the first reflectarray at a particular polarization. The cutout 1008 depicts the incident beam coming from an incident angle with elevation angle $\theta_{IN}$ and azimuth angle $\varphi_{IN}$, and depicts the reflected beam radiating at a reflected angle with elevation angle $\theta_{OUT}$ and azimuth angle $\varphi_{OUT}$. The incident beam is received by the first reflectarray and one or more feed elements in the first reflectarray illuminates the second reflectarray with feed signaling in a first polarization based on the received incident beam such that it is reflected back to the first reflectarray. The first reflectarray modifies the polarization of the reflected beam to generate an outgoing beam with a second polarization that passes through the second reflectarray. The directivity of the reflectarray antenna 1006 is achieved by considering the geometrical configurations of the wireless network 1000 (e.g., placement of BS 1002, distance relative to the reflectarray antenna 1006, etc.) as well as antenna specifications for the reflectarray antenna 1006 in network 1000, as described in more detail below. Various configurations, shapes, and dimensions may be used to implement specific designs and meet specific coverage area constraints. The reflectarray antenna 1006 can be placed in any wireless network environment, be it in a suburban quiet area or a high traffic area, such as a high-density city block. Use of a reflectarray such as the reflectarray antenna 1006 and designed as disclosed herein can result in a significant performance improvement of even 100 times current 5G data rates. The reflectarray antenna 1006 is a low cost, easy to manufacture and set up reflectarray, and may be self-calibrated without requiring manual adjustment to its operation.

It is also appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

As used herein, the phrase "at least one of" preceding a series of items, with the terms "and" or "or" to separate any of the items, modifies the list as a whole, rather than each member of the list (i.e., each item).The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Furthermore, to the extent that the term "include," "have," or the like is used in the description or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." The term "some" refers to one or more.

Underlined and/or italicized headings and subheadings are used for convenience only, do not limit the subject technology, and are not referred to in connection with the interpretation of the description of the subject technology. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate implementations can also be implemented in combination in a single implementation. Conversely, various features that are described in the context of a single implementation can also be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. Moreover, the separation of various system components in the aspects described above should not be understood as requiring such separation in all aspects, and it should be understood that the described program components and systems can generally be integrated together in a single hardware product or packaged into multiple hardware products. Other variations are within the scope of the following claim.

What is claimed is:

1. An antenna system having a plurality of layers, comprising:

a radio frequency integrated circuit (RFIC) layer;

an antenna layer comprising a plurality of radiating elements creating paths for transmission and receipt of RF signals, wherein the plurality of radiating elements comprises a first set of feed elements arranged along a first axis in one row laterally across an entire surface of the antenna layer to scan a field of view along the first axis and a second set of feed elements arranged along a second axis in one row laterally across an entire surface of the antenna layer, wherein the second axis is orthogonal to the first axis and the second set of feed elements is configured to scan the field of view along the second axis; and a polarizing layer positioned approximately parallel to the antenna layer.

2. The antenna system as in claim 1, further comprising a signal plane layer and a ground plane layer.

3. The antenna system as in claim 1, wherein the polarizing layer is a reflectarray structure having a grid structure forming a reflective surface.

4. The antenna system as in claim 3, wherein the grid structure includes an array of cells with at least one reflector element.

5. The antenna system as in claim 4, wherein the array of cells comprises:

a first cell positioned at a first angular position with respect to the antenna layer; and a second cell positioned at a second angular position with respect to the antenna layer, wherein the first and second angular positions are different.

6. The antenna system as in claim 4, wherein an axis of the array of cells is tilted with respect to an incident electric field and the array of cells are configured to superimpose reflected beams and modify polarization.

7. The antenna system as in claim 1, positioned within a vehicle radar system.

8. The antenna system as in claim 1, positioned within a traffic infrastructure system.

9. A reflectarray antenna system, comprising:

a first reflectarray comprising a polarizing grid configured to operate as a reflective surface in a first polarization and operate as a transparent surface in a second polarization different from the first polarization; and a second reflectarray comprising an array of reflectarray cells and arranged substantially parallel to the first reflectarray, the second reflectarray comprising a first set of feed elements arranged along a first axis in one row laterally across an entire surface of the antenna layer to scan a field of view along the first axis and a second set of feed elements arranged along a second axis in one row laterally across an entire surface of the antenna layer, wherein the second axis is orthogonal to the first axis and the second set of feed elements is configured to scan the field of view along the second axis, the second reflectarray configured to radiate radio frequency (RF) beams in the first polarization with one or more of the first set of feed elements and the second set of feed elements for reflection at the polarizing grid and to radiate reflected RF beams in the second polarization for transmission through the polarizing grid.

10. The reflectarray antenna system of claim 9, wherein the first set of feed elements and the second set of feed elements comprise patch elements.

11. The reflectarray antenna system of claim 9, wherein the array of reflectarray cells in the second reflectarray apply a phase shift to the RF beams in the first polarization to produce the reflected RF beams in the second polarization.

12. The reflectarray antenna system of claim 9, wherein the first reflectarray and the second reflectarray are separated by a predetermined distance.

13. The reflectarray antenna system of claim 9, wherein feed elements in the first set of feed elements or the second set of feed elements radiate RF beams concurrently toward a common location on the second reflectarray such that superposition of the RF beams produces a combined beam with a predetermined gain at that location.

14. The reflectarray antenna system of claim 9, wherein feed elements in the first set of feed elements or the second set of feed elements are switched sequentially.

15. The reflectarray antenna system of claim 9, wherein the first reflectarray applies a phase shift to the RF beams in the first polarization to modify its polarization by a predetermined amount.

16. The reflectarray antenna system of claim 9, wherein the first reflectarray has a first phase distribution and the second reflectarray has a second phase distribution that is mapped to the first phase distribution to cause RF beams originating from feed illumination to be reflected from the second reflectarray to a target reflector element in the first reflectarray.

17. The reflectarray antenna system of claim 9, wherein each of the first set of feed elements and the second set of feed elements includes a subarray of feed elements arranged along both axes such that cells are patterned on a surface of the second reflectarray between each of the first set of feed elements and the second set of feed elements and a periphery of the second reflectarray.

18. The reflectarray antenna system of claim 9, wherein the second reflectarray comprises an RF Integrated Circuit (RFIC) layer and an antenna layer disposed on the RFIC layer, wherein the antenna layer comprises the array of reflectarray cells and the RFIC layer comprises a plurality of RFIC components configured to apply a gain to the RF beams originating from feed illumination.

19. The reflectarray antenna system of claim 18, wherein each feed element in the first set of feed elements and the second set of feed elements is coupled to respective ones of the plurality of RFIC components in the RFIC layer.

* * * * *